United States Patent [19]
Grandmont et al.

[11] Patent Number: 6,030,851
[45] Date of Patent: Feb. 29, 2000

[54] METHOD FOR OVERPRESSURE PROTECTED PRESSURE SENSOR

[76] Inventors: Paul E. Grandmont, 46 Woodlawn Cir., Whitman, Mass. 02382; Clifford D. Fung, 9 Harding La., Mansfield, Mass. 02048

[21] Appl. No.: 08/869,014

[22] Filed: Jun. 4, 1997

Related U.S. Application Data

[62] Division of application No. 08/481,969, Jun. 7, 1995, abandoned.

[51] Int. Cl.⁷ .................................................. H01L 21/00
[52] U.S. Cl. .............................. 438/53; 438/52; 438/614; 438/678; 430/312
[58] Field of Search .............................. 438/53, 52, 577, 438/614, 670, 671, 674, 678, FOR 455; 430/312

[56] References Cited

U.S. PATENT DOCUMENTS

| | | | |
|---|---|---|---|
| 4,082,453 | 4/1978 | Knop | 355/88 |
| 4,401,521 | 8/1983 | Ohmura et al. | 204/12 |
| 4,413,051 | 11/1983 | Thomas | 430/312 |
| 4,698,285 | 10/1987 | Ehrfeld et al. | 430/5 |
| 4,742,023 | 5/1988 | Hasegawa | 438/614 |
| 4,744,863 | 5/1988 | Guckel et al. | 156/655 |
| 4,852,408 | 8/1989 | Sanders | 73/721 |
| 4,853,669 | 8/1989 | Guckel et al. | 338/4 |
| 4,859,573 | 8/1989 | Maheras et al. | 430/312 |
| 4,905,575 | 3/1990 | Knecht et al. | 73/721 |
| 5,051,338 | 9/1991 | Kato et al. | 430/296 |
| 5,062,302 | 11/1991 | Petersen et al. | 73/721 |
| 5,147,823 | 9/1992 | Ishibashi et al. | 430/323 |
| 5,206,983 | 5/1993 | Guckel et al. | 29/598 |
| 5,216,490 | 6/1993 | Greiff et al. | 257/415 |
| 5,220,838 | 6/1993 | Fung et al. | 73/721 |
| 5,226,232 | 7/1993 | Boyd | 29/846 |
| 5,234,571 | 8/1993 | Noeker | 205/70 |
| 5,295,395 | 3/1994 | Hocker et al. | 73/721 |
| 5,318,652 | 6/1994 | Hocker et al. | 73/721 |
| 5,357,807 | 10/1994 | Guckel et al. | 73/721 |
| 5,357,808 | 10/1994 | Fung et al. | 73/721 |
| 5,576,147 | 11/1996 | Guckel et al. | 430/313 |
| 5,679,502 | 10/1997 | Siddons et al. | 430/312 |

*Primary Examiner*—Michael Trinh
*Attorney, Agent, or Firm*—Lahive & Cockfield, LLP

[57] ABSTRACT

A structure and method of fabrication is provided for a micromechanical overrange protected pressure sensor. A pressure sensor having a silicon substrate is provided with a cavity and a deformable diaphragm wherein deflection of the diaphragm in response to pressure is limited by a forward pressure stop. A method is provided for electrodepositing a metal layer which is attached to the substrate adjacent to the diaphragm to provide a reverse pressure stop in response to pressure supplied to the underside of a diaphragm. The metal layer has a relatively low thermal coefficient of expansion and is patterned through use of a photo-resist layer. A previously deposited precision spacer between the diaphragm and reverse pressure stop is removed to provide a precision gap between the reverse pressure stop and the diaphragm.

Micromechanical elements of relatively great size, yet having precision dimensions or positioning are herein fabricated by lithography of patterned resist films up to several hundred microns thick, exposed and developed to great depth with faithful pattern delineation. The patterns formed by development of the exposed resist are then metallized, preferably by pulse electroplating, to form structural or mechanical elements. Deep film patterning may be achieved by laying down successive layers of a dry film resist and exposing each layer after it is deposited.

26 Claims, 5 Drawing Sheets

METHOD FOR OVERPRESSURE PROTECTED PRESSURE SENSOR

This application is a divisional application of Ser. No. 08/481,969 filed on Jun. 7, 1995, abandoned. The contents of all of the aforementioned application(s) are hereby incorporated by reference.

BACKGROUND

The present invention relates to the fabrication of micromechanical structures, and more particularly to fabrication of such structures by techniques derived from semiconductor fabrication processes, or techniques applicable to the production of hybrid semiconductor/mechanical devices such as sensors.

In the last decade or so a number of techniques have been developed for forming mechanical structures of extremely small size by depositing a film, and masking, etching or otherwise patterning such film to produce a diaphragm, force responsive beam or wall, resonant structure, diffusion tunnel or other miniature structure or mechanical element. When produced on semiconductor grade crystalline wafers, these structures can not only enjoy the mechanical strength of single crystal structures, but may include signal conditioning or sensing circuitry integrally fabricated on the wafer. The submicrometer-level pattern forming techniques developed for semiconductor fabrication allow the construction of many such structures or devices on a single wafer, which may then be scored and divided into individual units, and packaged.

As representative of such sensing structures, one may consider oscillating plate type structures, such as shown in U.S. Pat. No. 4,699,006, or more static mechanical elements such as shown in U.S. Pat. No. 4,744,863. The last-mentioned patent shows a diaphragm formed over a closed chamber, with electrical sensing elements fabricated on the diaphragm. Such diaphragms may be of small overall area so that despite their thinness they can withstand high pressures. While such a structure provides an effective pressure sensor mechanism, it would be desirable to provide two-sided protection to protect the diaphragm against pressure spikes when used in a high pressure environment, in a pressure spikes when used in a high pressure environment, in a manner similar to the pressure stops commonly provided in larger mechanical construction of push-pull differential pressure sensors. In general, however, microlithographic techniques are suitable only for forming relatively thin elements on the wafer surface.

To provide a mechanically strong overpressure stop above the diaphragm requires fabricating a metal structure that is considerably thicker than the micrometer-scale thicknesses characteristic of circuit or diaphragm type structures, and the resist-masking techniques that have proven effective for formation of microelectronic elements are inadequate for the much thicker architecture of forming frames, posts, stops and housings, or for fabricating small machine elements such as gears having a thickness of over ten or twenty microns. Thus, at these greater thicknesses considered necessary to provide sufficient stiffness for pressure stops, gears or the like, there is a need for development of thick microstructure fabrication techniques.

SUMMARY OF THE INVENTION

In accordance with the principles of this invention, a differential pressure sensor has been developed comprising a silicon substrate having a cavity formed into the top surface of the substrate wherein the floor of the cavity defines a forward pressure stop. A deformable diaphragm covers the cavity and responds to the application of fluid pressure by deflecting. Deflection in the forward direction is limited by the forward pressure stop. The pressure sensor also comprises a reverse pressure stop formed of electrodeposited metal attached to the substrate and spaced over the diaphragm. The reverse pressure stop is of sufficient thickness such that deflection of the diaphragm in response to pressure supplied to the underside of the diaphragm is limited by the reverse pressure stop.

In accordance with the above, the differential pressure sensor includes means for applying a first fluid pressure to the top side of the diaphragm and a second fluid pressure to the underside of the diaphragm as well as electrical means for detecting the relative deflection of the diaphragm due to the pressure differential between the first and second fluid pressures exerted across the diaphragm.

In the preferred embodiment of the invention, a precisely defined spacer is positioned between the reverse pressure stop and the diaphragm. Further, the reverse pressure stop comprises a metal layer having a low thermal coefficient of expansion. The metal is preferably chromium or a nickel alloy. The sensing means for the diaphragm is preferably piezoresistive elements positioned to sense movements of the diaphragm in response to pressure changes.

Also in accordance with the present invention a method is provided for fabricating the overrange protected pressure sensor defined above. The sensor is fabricated by depositing a layer of semiconductor type material to form a spacer adjacent to the sensing diaphragm, a metalization layer is then applied to the silicon substrate and spacer. Next, a layer of resist is deposited upon the metalization layer and patterned to provide a layer of cured and uncured resist. The uncured resist is removed to partially expose the underlying metalization layer whereupon the metalization layer is used as an electrode to electrodeposit a thick metal layer upon the exposed sections of the metalization layer. This metal layer forms the mechanical overpressure stop once the remaining resist and the spacer have been removed.

In the preferred embodiment of the invention, the resist layer has a thickness substantially greater than 10 micrometers and is developed and exposed in substantially uniform vertical sections so that the resist can be removed selectively in a defined pattern. A preferred resist is a dry film photoresist deposited in layers of less than 25 micrometers. The initial resist layer, however, may be spun-on resist. In order to cure the resist in the preselected pattern to the preferred depth a thermal gradient may be provided between the top and bottom of the resist layer in order to enhance the sensitivity of the resist to curing radiation at the bottom of the layer.

In accordance with the present invention micromechanical elements of relatively great size, yet having precision dimensions or positioning are fabricated by lithography of patterned films over approximately fifty microns, and up to several hundred microns, thick. The films are formed of photosensitive polymer material of a type commonly used for semiconductor lithography, and are exposed according to the invention and developed to great depth with faithful pattern delineation. The patterns formed by development of the exposed resist are then metallized, preferably by electroplating, to form structural or mechanical elements. Conventional thin film resists are patterned to form spacers or shims in regions where precise height or offset is required, and the spacers are removed after fabricating the mechanical element.

According to one aspect of the invention, film patterning is achieved by laying down successive layers of a dry resist, e.g., dry film, which are exposed after each layer is deposited. Development may be performed in stages, once after each layer is deposited, or may be performed only after several or all layers have been deposited and exposed.

According to another aspect of the invention a thick layer of polymer resist material is laid down, and is patterned by exposure to radiation along several different exposure axes to create a conical region of partially exposed polymer around pattern boundaries that resists undercutting of edges during development.

According to still a third aspect of the invention, the substrate is mounted on a heated stage and heat is applied to introduce a thermal gradient in the resist during the course of exposure. Optionally a cooling fluid is circulated over the top surface, enhancing a thermal gradient which counteracts the drop-off of sensitivity, as a function of depth, occurring in exposure or development of the film. The thermal gradient may be a non-equilibrium state established by heat pulses, and the exposure performed in intervals synchronized with the pulses.

BRIEF DESCRIPTION OF THE DRAWINGS

These and other features of the invention will be understood by reference to the drawings and related description of processes according to the invention and an exemplary structure produced by the processes, wherein

FIGS. 3A–3F show steps in fabrication of a metal mechanical stop and complete structure in accordance with the present invention;

DETAILED DESCRIPTION OF THE INVENTION

The invention is best understood by considering the steps involved in fabricating a mechanical element according to the present invention on a semi-completed wafer having various conventional electromechanical elements or structures present thereon.

Figure 1:
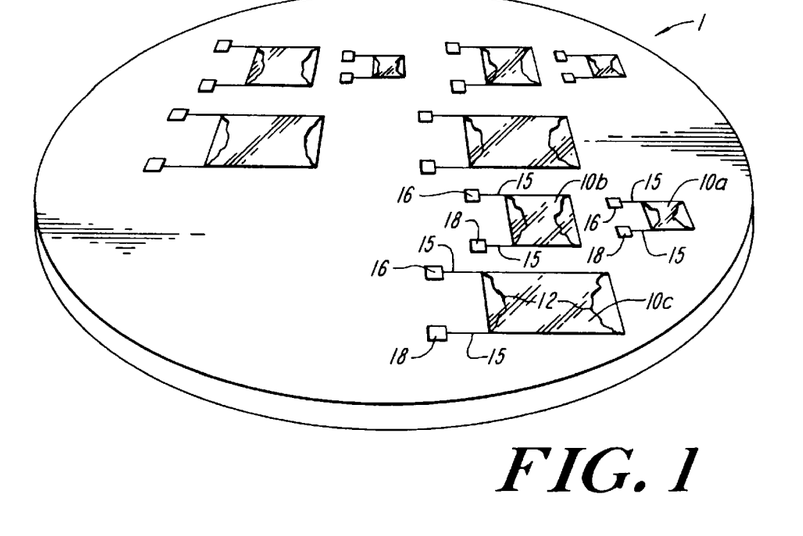
FIG. 1 is a perspective view of a wafer having a plurality patterned electromechanical elements formed thereon.

Such a semi-completed sensor wafer 1 is illustrated in perspective in FIG. 1, and contains on its surface a number of diaphragm regions 10a, 10b, 10c which illustratively are of several different sizes, e.g., having a cross-dimension of 30, 100, or 500 micrometers. Each diaphragm is formed by thin film techniques and is positioned over a hollowed-out chamber, that may be vacuum-sealed as shown in U.S. Pat. No. 4,744,863, mentioned above, or may communicate with a pressure port on its underside.

Sensing elements 12 are formed on each diaphragm, and respond either to motion of the diaphragm itself, or to stresses induced by such motion, to generate or alter electrical signals. For example, the elements 12 may be piezoresistive elements, or may consist of electrical or optical pick-offs of various types. For purposes of this discussion, the elements will be assumed to be polysilicon piezoresistive elements, which may, for example, be arranged away from nodes along regions of maximum stress, in a bridge configuration to cancel noise, so as to faithfully respond to the magnitude of diaphragm displacement. Electrical connections 15 extend from the sensor elements 12 to lands metalized pads 16, 18 which allow connection of the device to appropriate circuitry.

An individual unit may consist of a sensor assembly having a single diaphragm, several like-size diaphragm regions (to achieve redundancy for high chip yield, long lifetime or multiplicity of simultaneous measurements), or a collection of different-size diaphragm regions to provide a sensor covering a plurality of different measurement ranges of the pressure or vacuum spectrum.

Figure 2:
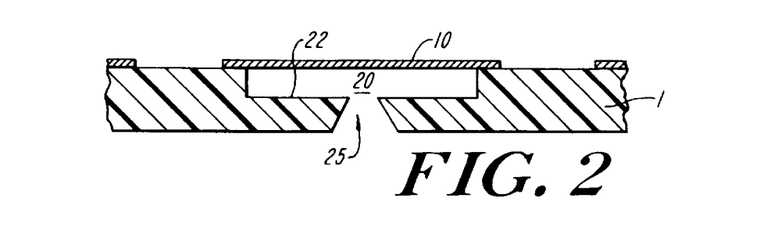
FIG. 2 is a partial cross-sectional view through the wafer of FIG. 1 at the position indicated by section lines II—II.

FIG. 2 shows one diaphragm structure 10 of the wafer 1 in sectional view. As illustrated, a polysilicon diaphragm 10 is positioned over a cavity 20 that has been formed with sacrificial material on the wafer and then opened and emptied by a back-side etch through the wafer 1 to create an access port 25 for connection to a pressure sensing environment. For simplicity, the section does not show sensor elements 12, although it will be appreciated that these elements will generally be formed as thin film elements (e.g., polysilicon elements in the case of one type of piezoresistive sensor) that extend slightly above the diaphragm top surface.

The cavity 20 may be defined by various steps of forming etch stops, masking and then oxidizing the region where a cavity is to be located, depositing epitaxial surface material over the oxide region to form the diaphragm 10, and then etching through to remove the oxide, so that the cavity floor 22 is located at a very precise distance from the deposited diaphragm and keeps it from traveling beyond its limit of elastic extension in the direction of cavity 20. The cavity depth is selected to cause the diaphragm to bottom out on the cavity floor 20a after a displacement between about (0.5) and (2.0) micrometers. The diaphragm itself may be one to four micrometers thick, and is subject to failure if it should undergo excessive deflection. The cavity floor 20a therefore acts as an overpressure stop to prevent diaphragm failure in the event excessive pressure is applied to the top surface of the diaphragm 10

The discussion below will describe the formation of a purely micromechanical element located above the diaphragm of FIG. 2 and having a comparable degree of precision in its location, yet of a thickness many times greater so that it has the mechanical strength to serve as a structural overpressure stop to protect the diaphragm against excessive flexing in a direction opposed to the cavity floor 20a due to pressure applied through port 25.

Figure 3A:
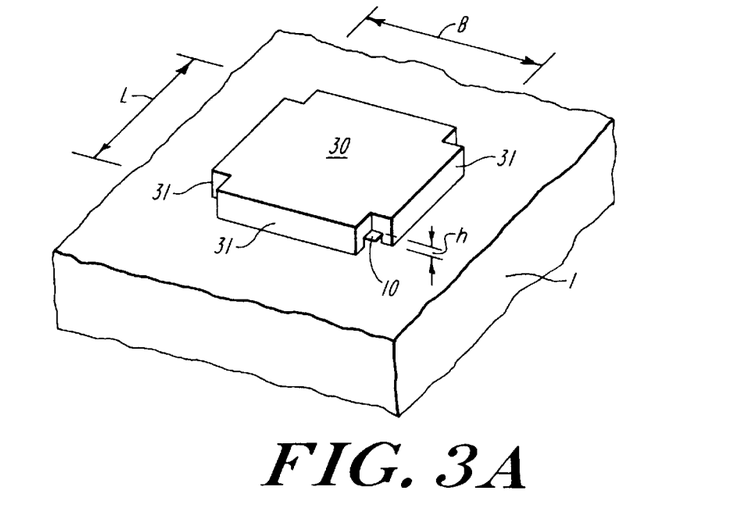

By way of technical exposition of the ends to be attained by the illustrative embodiment of the present invention, the primary objective is to fabricate a strong, relatively stiff and well adhered cap with a precision gap between itself and the diaphragm. Calculations to evaluate the forces and deflection of the stop under over-range conditions and determine the thickness needed for the stop for different overall dimensions or different materials are summarized below. The calculations assume the size of the largest diaphragm to be 250 mm×250 mm $(0.010 \text{ in})^2$, and assume a maximum over-range pressure of six kpsi, with the length and width L and B of the plated portion each extending 0.001" beyond the edge of diaphragm, i.e., with an over-range stop geometry: B=0.012 in., L=0.012 in., as shown in FIG. 3A, in which the overall form of the thick mechanical stop 30 to be formed over the diaphragm is shown. For the above diaphragm, the following representative mechanical characteristics of a thick film cap structure 30 were calculated.

1. Applied force = max. pressure × max. diaphragm area $$W = \frac{6 \times 10^3 \text{ lbs.}}{\text{in}^2} \times (0.010'')^2 = 0.6 \text{ lbs/in}^2.$$

2. Max. moment = $\frac{2W(L/2)^2}{L^3} \times (L/2)^2 = WL/8$ $Mmax = WL/8 = \frac{0.6 \text{ lbs.} \times 0.012 \text{ in.}}{8} = 9.0 \times 10^{-4}$ in-lbs.

3. Stress = $MC/I$ where $I = BH^3/12$; $C = H/2$ $$\text{Stress} = \frac{M(H/2)}{BH^3/12} = 6M/BH^2$$

Evaluating the stress for different stop thicknesses:
for H=0.002 in. Stress=112 kpsi
H=0.003 in. Stress=50 kpsi
H=0.004 in. Stress=28 kpsi Thus, a stop thickness of 0.004 in. will keep stress levels during a 6 kpsi over-range pulse below 30 kpsi., which is considered a safe maximum level.

4. Max. Deflection=$WL^3/192$ EI
or Dmax=$WL^3/16EBH^3$, where I=$BH^3/12$, and where E is the elastic modulus of the stop material.

For a given stop geometry and maximum over-range pressure, the deflection varies with the modulus of elasticity of the material used to fabricate the stop. In the case of the above defined stop geometry and applied force conditions, we have the following:

$B = 0.012$ in.
$L = 0.012$ in.
$H = 0.004$ in.
$W = 0.6$ lbs.

$Dmax = \frac{84.375 \text{ in.}}{E}$ or $\frac{2.143 \times 10^3 \text{ mm}}{E}$ If the maximum allowable deflection of the stop at over-range is 0.01 mm, we have Emin=214.3 kpsi. This is a very low modulus of elasticity for most plated metals, so the requirements for the stop can be realized with plated metal fabrication, so long as their modulus of elasticity >>220 kpsi and tensile strength >>30 kpsi.

Two other significant sources of stress should be considered. These are (1) temperature dependent stress due to mismatches in the coefficient of thermal expansion (TCE) of the stop and substrate material, and (2) internal stress within the stop material deposit itself that develops during the plating operation. These effects are analyzed separately below.

The temperature dependent stress is preferably kept low by ensuring that the TCE of the stop material be close to the TCE of the substrate silicon wafer. For the case of a polysilicon pressure transducer, the working temperature range is desired to be −40° C. to +120° C., or ±80° C. range centered at approx. 40° C. Temperature dependent stress is proportional to the net mismatch in TCE, the maximum temperature swing, and the moduli of elasticity of the stop and substrate materials.

ΔTCE (ppm/° C.)×Tmax(° C.)=max. strain at temperature limits, and strain×modulus of elasticity=stress.

Some of the temperature-induced stress will be transferred to the substrate/diaphragm. The amount of stress shared between the substrate and the stop depends upon the relative thicknesses and the relative moduli of elasticity of the substrate and the stop. Stress of this nature can cause span shift errors as well as sensitivity errors in the measurements made with the sensing unit, and thus is desirably to be avoided or minimized. It also has an effect on the adhesion of the stop to the substrate due to generation of shear forces.

For a silicon wafer material, the average coefficient of thermal expansion over the temperature range of 50° C. to 150° C. in the wafer plane (the x-y plane of the wafers used to fabricate polysilicon pressure transducers) is 3.16 ppm/° C. This is an extremely low coefficient of expansion compared to most plated metals, so applicant has selected only low-TCE metals as suitable for forming a plated pressure stop.

Table I is a list of electrodepositable pure metals that have relatively low TCEs (i.e, less than 7.0–8.0 ppm/° C.). Electroplated alloys with a low TCE may also be used, but published TCE data for electrodeposited alloys is limited, and in general TCE data varies widely from source to source even for all of the materials listed in Table I.

TABLE I

| Pure Metal | TCE (ppm/°C.) | Known & Possible Low TCE Alloys |
|---|---|---|
| Osmium | 2.6 | Fe-Ni |
| Ruthenium | 5.0 | Ni-P (>40% P) |
| Chromium | 6.2 | Ni-B (>10% B) |
| Rhenium | 6.7 | Ni-P-B (high P, B) |
| Iridium | 6.8 | Ni-W |
|  |  | Cr-Mo | alloy is electroplated in one or two proprietary processes. Electroless Ni—P and Ni—B processes are also common, but the boron and phosphorus contents of reported processes are far too low in these deposits to obtain the necessary low TCE property. Most of the other materials have been electrodeposited experimentally, but are not in wide, or possibly any, commercial use.

Applicant considers iron-nickel alloy a less desirable alternative because it rusts readily, especially with the high iron content alloy needed to achieve a low TCE. It also has undesirably high internal tensile stress as it is deposited.

Chromium therefore appears to be the best choice for a number of reasons. It is strong and very stiff, as well as very corrosion resistant. It can be electrodeposited with near zero internal stress. A multitude of commercial bath formulations and information exists on electrodeposition of chromium, as well as considerable expertise in the specific area of crack-free, low internal stress deposits for this metal. Most of these processes involve the technique-of pulse-electroplating, where current is applied to the cathode (substrate) as a square wave, interrupted DC condition to allow buildup to proceed to thick deposits with low hydrogen inclusion.

For chromium metal, the TCE is 6.2 ppm/° C., compared to 3.16 ppm/° C. for silicon for a net mismatch of 3.04 ppm/° C. Chromium is strong and very stiff, with an elastic modulus 25% higher than silicon. High quality, crack-free, low internal stress electrodeposited chromium has been reported in the literature, with tensile strength >100 kpsi, and an elastic modulus of 30 mpsi.

For the case of a chromium stop we have the following: 3.04 ppm/° C.×80° C.=243 ppm strain at temperature limits 2.43×10$^{-4}$×3.0×10$^7$ psi=7.29 kpsi stress max. This stress level occurs at the maximum temperature limits, and linearly decreases to near zero if the deposition temperature is near 40° C., the temperature swing midpoint. This is not a very high level of stress for the stop itself, but the effect of this on the diaphragm must be evaluated. Because both silicon and electrodeposited chromium exhibit virtually no elongation or compressibility, forces of this nature would presumably cause bending of the substrate/diaphragm, as well as applying shear forces on the interfacial adhesion.

Calculations were performed to determine the magnitude of this effect upon the diaphragm, and show that membrane strain and bending strain are fairly low, and that the bend radius at the maximum temperature swing is quite large. The deflection of the silicon (and its attached diaphragm) is calculated to be very small, about 0.3 angstroms at the maximum temperature swing. Although the stress that the silicon substrate can have is fairly high, the virtual incompressibility and lack of elongation of the substrate make transfer of the stress to the diaphragm unlikely except in the form of bending strain.

As regards internal stress, the stress within the deposit is presumed to cause similar effects as above. Stress in electrodeposited chromium as reported in the literature spans a wide range, from—113,000 psi (compressive) to over 157,000 psi in tension. Stress is influenced by thickness, plating bath temperature, current density during plating and other factors.

In general, thin deposits (<3 mm) from low temperature (30–46° C.) baths exhibit high tensile stress, above 70,000 psi. Stress in thicker deposits usually decreases with thickness, reaching an equilibrium value when plated to above 50 mm in thickness. The reduction in stress with thickness is a result of stress relief by cracking.

Even moderate stress levels within the deposit can be disastrous for this particular application, and a cracked deposit is probably useless for this application since cracks would reduce its tensile strength to under 20,000 psi. Annealing to relieve stress in chromium deposited over silicon elements is considered impractical, as the annealing temperatures of 1100–1200° C., are too high for the finished pressure transducer chip with its interconnections and bond pads. These factors would at first glance appear to rule out fabrication by electrodeposition of chromium. However, by depositing the chromium using a pulse-plating process, a thick chromium deposit can be laid down as a crack-free layer with close to zero internal stress as deposited.

Another suitable metal/deposition process is pulse-electrodeposition of low stress, crack-free Cr—Mo alloy, which applicant expects to have a somewhat lower TCE than that of pure chromium. This process has been developed by the Pratt and Whitney Company, and is capable of commercial application.

The foregoing discussion of mechanical properties and constraints for a representative mechanical element is intended to provide guidance for the practice of the present invention in fabricating diverse devices, in the manner now to be described more completely for formation of a diaphragm overpressure stop.

FIG. 3A illustrates a general form of the desired thick metal structure 30, which is to be firmly and preferably conductively anchored by posts, feet or sills at its periphery, and having precisely-located edge positions and the lower surface height "h" above the diaphragm. This lower surface is to be formed with extreme precision. This is achieved in accordance with a basic process of the present invention as follows, starting from a semi-completed micromechanical diaphragm structure of or similar to the type shown in FIG. 2 and as more fully described in U.S. Pat. No. 5,220,838 to Fung et al.

Figure 3B:
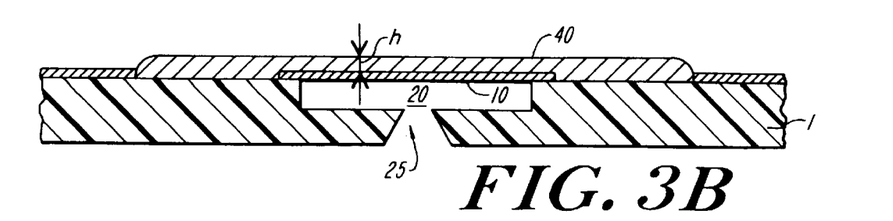
Figure 3C:
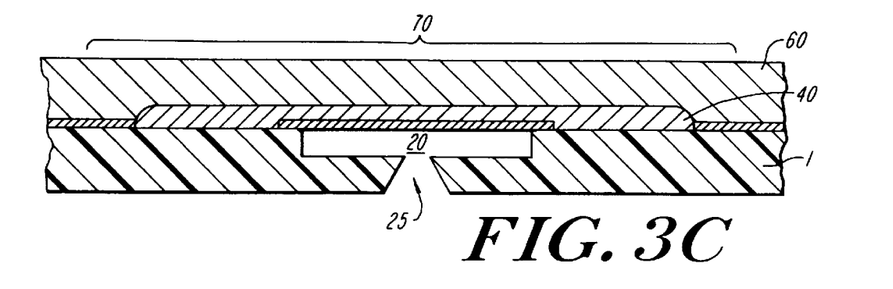

First, as shown in FIGS. 3B and 3C, a precision spacer element 40 is formed over the diaphragm and a peripheral band thereabouts. By way of scale, spacer 40 has a thickness equal to the intended gap "h" between the diaphragm and the overpressure stop, which, as described above, will be between approximately one-half and two micrometers, depending on the diaphragm span, its thickness, and the maximum intended surge pressure operating environment. Spacer 40 may be formed by depositing a semiconductor-type photolithography layer of the desired thickness over the wafer, and exposing and developing the resist to leave a localized blanket of the desired thickness over the diaphragm. Virtually any resist that can be applied with uniformity in a layer of the desired depth may be employed. The only compatibility constraint is that the spacer not be dissolved during the various steps involved in fabricating the cap, as described below. When, as illustrated in FIG. 1, the diaphragm is to have elements such as sensors 12 extending above its surface, it may be desirable to employ a two layer resist for this spacer layer, wherein a planarizing sublayer formed of carbon or the like is first applied to smooth the surface topography. On the other hand, when the sensing elements or other such surface features extend a significant distance across the intended gap, it may be preferable to use a single, and more viscous resist formulation that allows the resist to follow the underlying topography, thereby creating a spacer 40 having a bumpy top surface, so as to define recesses in the later-formed cap to accommodate the protruding diaphragm sensor structures. At all events, the layer is applied and patterned to leave a precision spacer 40 (FIG. 3B).

Following the formation of spacer 40, a thin metalization layer 80 is applied to the entire surface of the wafer as shown in FIG. 3C. This layer allows current to be applied to the exposed areas of the wafer surface for electroplating and also provides a base or transition layer that promotes adhesion of electrodeposited metal in the peripheral region about the diaphragm. The adhesion layer 80 is preferably deposited by a relatively energetic process, such as sputtering, and is applied in a sufficient thickness to provide the high level of ohmic conductivity necessary for the cathode in a current pulse deposition electroplating process. This layer is preferably formed of sputtered chromium, which adheres well to silicon, and has a well-matched coefficient of expansion, or is formed alternatively of titanium.

Figure 3D:
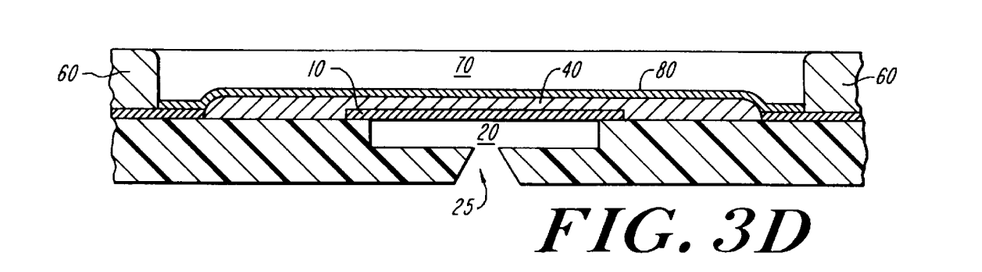

Next, a layer of resist or masking material 60 is applied over the whole wafer, and is patterned in the region overlying the diaphragm to create a cavity 70 as shown in FIG. 3D in which the cap is to be formed. As described in the discussion of mechanical properties above, this cap structure 30 (FIG. 3A) is to stand on supporting legs or walls anchored in a peripheral region 71 slightly outside the diaphragm.

By way of scale, layer 60 is substantially thicker than the spacer 40, for example, approximately 100 micrometers thick, its thickness corresponding to the necessary structural thickness of the metal cap. It may also include some margin of error to allow for etching away a portion of the electrodeposited layer in a finishing or material removal step, as described further below.

As discussed above, the location of edges of the pattern-defining cavity 70 will in general require a high degree of precision, e.g., under ten micrometers and preferably almost an order of magnitude less, since it defines the position of a conductive cap member located between electrical and mechanical elements having characteristic dimensions of that scale. In general, accurate feature definition and positioning on this scale would not be expected from a thick resist-like layer 60, because exposure and development in thick layers are non-uniform processes, and can introduce poorly-controlled shrinkage or swelling effects when the thickness is disproportionately large compared the scale of pattern resolution.

Accordingly, applicant has developed a number of specific processes for the formation of the pattern cavity 70 with sufficient precision to define such a plated overpressure cap. These processes are discussed further below, with reference to FIGS. 4–7. For present purposes, however, it suffices to note that the cavity 70 is formed in the shape of an open-faced mold in which the cap member 30 (FIG. 3A) is to be deposited.

Figure 3E:
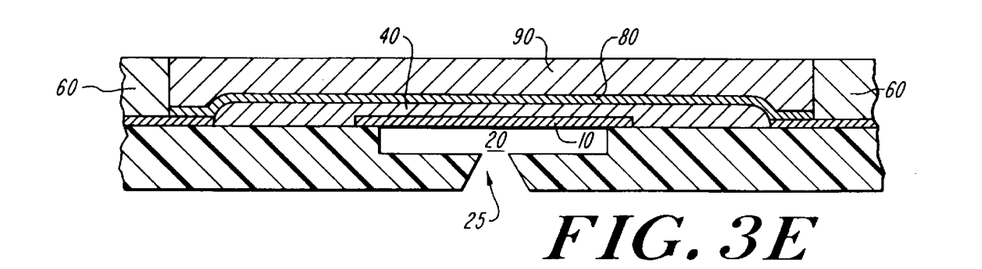

Following the formation of cavity 70, the wafer is electroplated, preferably by a pulse electroplating process as indicated above, to lay down a thick metal layer 90 of at least 30–50 micrometers and preferably 100 micrometers thick, filling cavity 70, as shown in FIG. 3E, thus forming the desired cap structure 30 (FIG. 3A).

Preferably, this electroplated layer is chromium. The current density required for chromium electroplating is believed to be between about four amperes and one hundred amperes per square inch, with a multi-sensor wafer typically requiring approximately one square inch total area of plated cap structures. A variable square wave switching system using a high current rectifier allows the plating of low stress crack free films.

After the thick film metalization, the thick masking layer 60 is then removed, e.g., by solvent dissolution, in a straightforward manner. Once layer 60 has been removed, exposed portions of the pre-metalization layer 80 are etched away. No masking is necessary as the thickness of this background metalization is well below several micrometers, and it is readily etched away without cleaning off more than one percent of the thickness of the deposited metal cap structure 30 formed from layer 90.

It should be noted that the cap structure 30 does not entirely enclose the diaphragm, but rather is supported above the diaphragm by peripheral posts or feet 31 (FIGS. 3A and 3F) leaving open sides, so that once layer 60 has been eroded down to within a distance "h" of the diaphragm, the first-deposited spacer element 40 may-be dissolved, thus opening the precision gap "h" between the diaphragm 10 and the cap 30.

This final operation to complete the finished structure of FIGS. 3A and 3F consists of dissolving the sacrificial spacer 40 and is accomplished using a solvent such as acetone that is compatible with, i.e., does not damage, the structures on the diaphragm or the structures and circuit elements on the wafer. Since the gap "h" is typically about one micrometer, and the cap 30 may span a several hundred micrometer square, this removal will take considerable time. To expedite this step of the process, applicant contemplates in an alternative embodiment forming the cap as a windowed or perforated structure, allowing greater solvent access during the spacer removal step. A perforated step may additionally provide a better forward pressure port for the fill fluid of the sensor during operation. The backside etch required to open port 25 may also be preferably delayed until the final steps of this process before or after removal of sacrificial spacer 40.

In the above described steps, variations are possible, both in the nature of the deposited patterns and materials, and in their ordering. For example, the pre-metalization layer 80 may be deposited in the desired locations by conventional thin-film lithography patterning techniques prior to deposition of the thick resist layer 60, or may be deposited by other metalization techniques, such as laser or ion beam assisted patterned CVD or by focused ion beam deposition or the like.

Figures 6A, 6C:
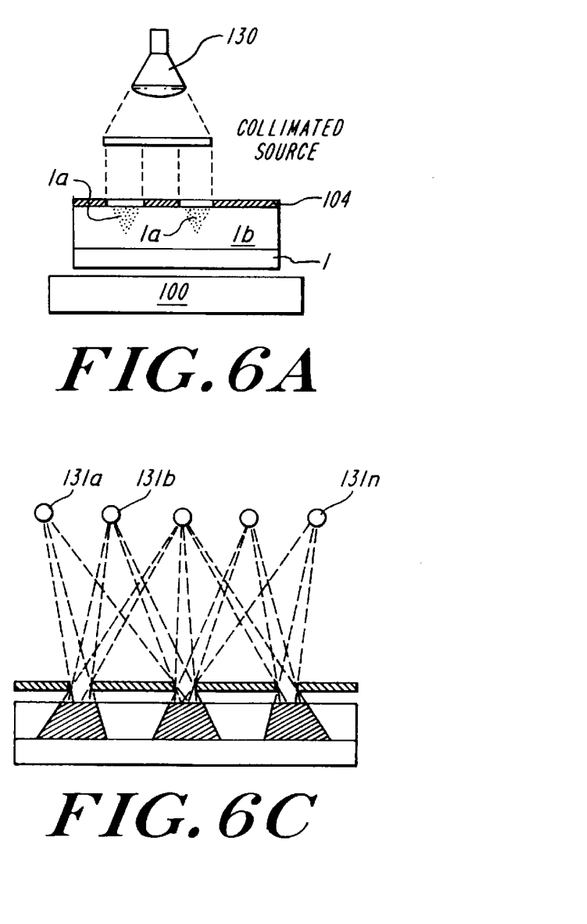
FIGS. 6A–6C illustrate process steps for forming the structure of FIG. 3 according to the principles of the invention.

However, as noted above, a principal achievement of this process is the formation of thick mechanical structures defined by thick film lithography, namely lithography of layer 60, and this step merits more detailed discussion. FIGS. 4–6 discuss details of exposure and development techniques for achieving a sufficiently well defined pattern in a film this thick.

By way of general background, exposure with a suitable high-definition source of radiation, for example FIB, e-beam or UV, entails a substantial level of absorption of the exposure radiation, that results in underexposure of the lower portions of resist. The absorption coefficient can be quite high, with the illumination level experiencing a substantial drop-off below one micrometer that increases exponentially with depth. For example, at various particular wavelengths in the ultraviolet, different resists may entirely extinguish the exposure radiation within a depth of five to ten micrometers.

When a resist is inadequately exposed or hardened, wet development or baking of the resist can result in substantial swelling or shrinkage that misaligns features, vertically skews the pattern with in-plane shear forces, or cracks the resist.

These problems and others in patterning thick films, whether initially caused or first physically manifested during exposure or during development of the exposed pattern, are greatly reduced by the present invention.

As shown in FIGS. 4A–4D, these problems are addressed in one aspect of the present invention, by a process of building up a thick film pattern by laying down and patterning successive layers of a thinner dry film resist 93a, 93b on a structure similar to FIG. 3B. This metalization layer 80 is not shown in these views for reasons of clarity.

Figure 4A:
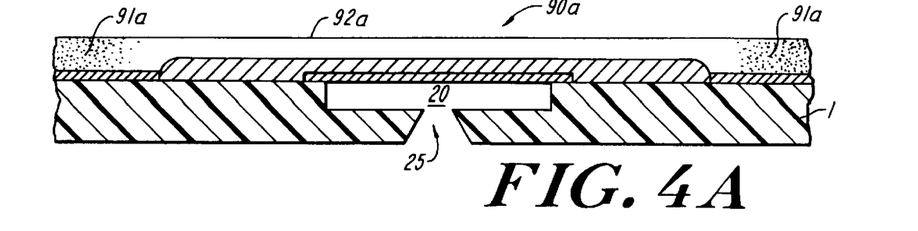
FIGS. 4–4E show details of one aspect of the coating and exposure for forming thick mechanical elements according to the present invention.
Figure 4B:
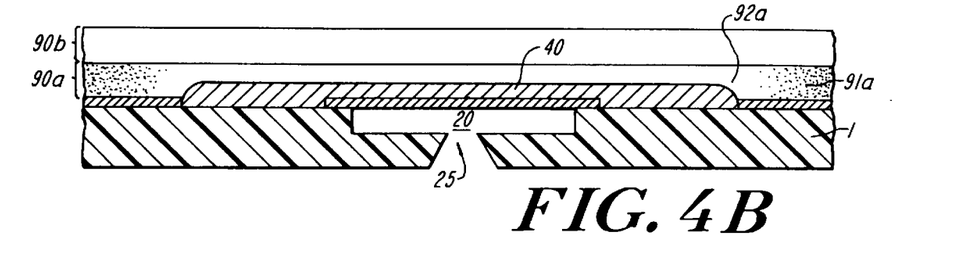
Figure 4C:
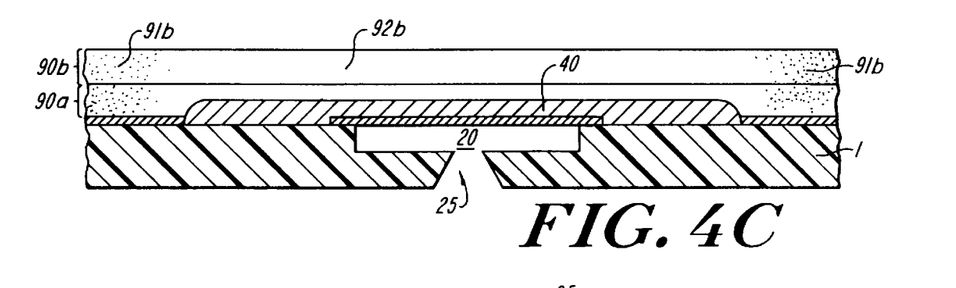
Figure 4D:
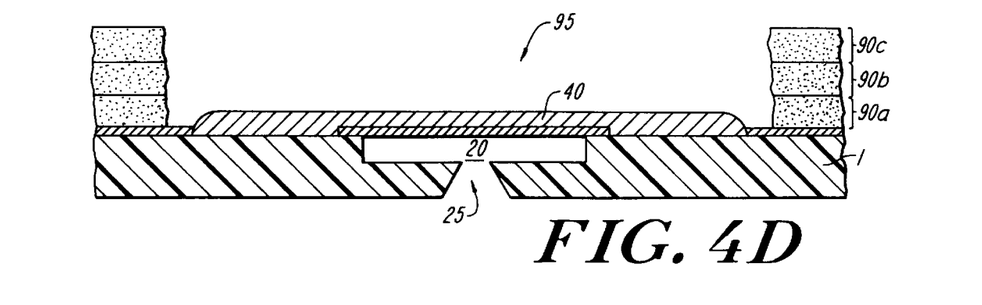
Figure 4E:
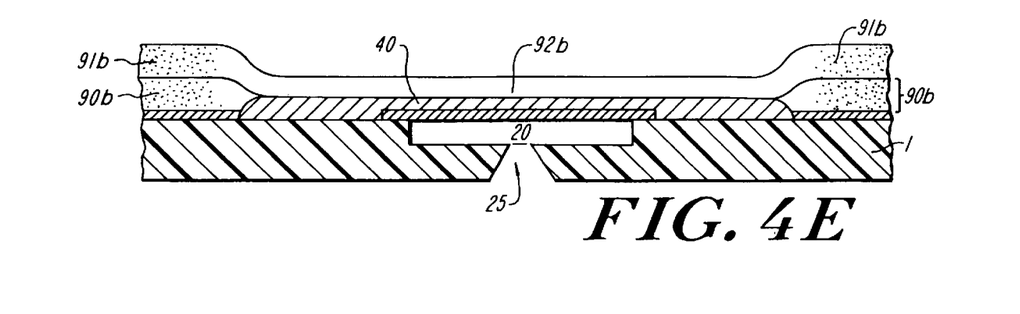

A first layer 93a is deposited and is exposed to delineate the intended masking portions 91a and cavity portions 92a. Then a second layer 93b is placed over layer 93a and it in turn is patterned to form the next layer of masks 91b and cavity 92b (FIG. 4C). After a sufficient number of layers 93a, 93b . . . 93n are deposited and patterned, the resist is developed, removing the unexposed regions 92a, 92b . . . 92n. Alternatively as shown in FIG. 4E, each dry film layer may be developed immediately after it is exposed, so that each successive layer 93i is draped over the pre-existing cavity formed by patterning and partial removal of the previously developed layers 93a . . . 93i. Using this latter approach, the initial stage of which is illustrated in FIG. 4E, the already patterned and developed regions may serve as dimensionally stable anchor regions that limit the ability of succeeding layers to shift under the swelling or shrinking that occurs in patterning each later layer. FIG. 4E is a view corresponding to the stage shown in FIG. 4C, wherein a second film layer has been applied and exposed, but not developed, over an already exposed and developed first film layer.

Using either of these sequences, the final multi-layer film is a fully developed film 95 (FIG. 4D) of great thickness comparable to resist step 60 of FIG. 3D, developed throughout its depth and patterned with micrometer-scale definition.

In accordance with another implementation of the invention, a thick cap structure 30 is formed with similar resolution and fidelity by imposing a thermal gradient during one or more of the patterning steps extending through the thickness dimension of a thick resist film.

Figure 5:
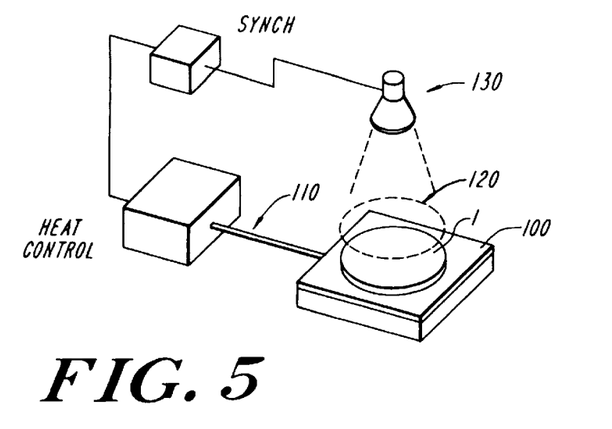
FIG. 5 illustrates another aspect of wafer exposure for forming thick mechanical elements according to the principles of this invention.

FIG. 5 shows one apparatus for patterning according the this aspect of the invention. The wafer 1, on which a thick, e.g., fifty to one hundred fifty micrometer thick, resist film has been applied, is placed on a stage 100 through which a heating device 110 applies heat to raise the temperature thereof non-uniformly, by applying heat to one side of the substrate.

Optionally, cooling means, indicated in phantom by 120 is applied in contact with the top surface of the wafer to cause an enhanced thermal gradient to exist between the top and bottom of the resist. Once the thermal gradient is established, the exposure source 130 is energized to expose the wafer in the desired pattern.

By way of example, the cooling may be implemented by circulating a cooling fluid over the surface of the wafer, or, if for example an x-ray type contact mask is used for exposure, by placing a radiation-transparent cooled cell over the wafer and mask.

Alternatively, the gradient may be introduced as a transient phenomenon by intermittently energizing for a short pulse of a few milliseconds or less a heater, such as a ribbon heater, that raises the temperature at the bottom of the wafer by a substantial amount, e.g 50° C. or more. This creates a thermal pulse that travels toward the surface of the film. After the heater is actuated, and when the depths of the film experience a substantial thermal rise, the exposure source is energized, so that exposure illumination reaches the lower region of the resist layer at a time when that region is appreciably hotter than the surface, causing a many-fold increase in exposure activity, compared to the effect at the still-cool surface region. Once the wafer has returned to an equilibrium temperature, additional synchronized heating and exposure pulses are applied to yield a full exposure dose at all levels of the film.

Figure 6B:
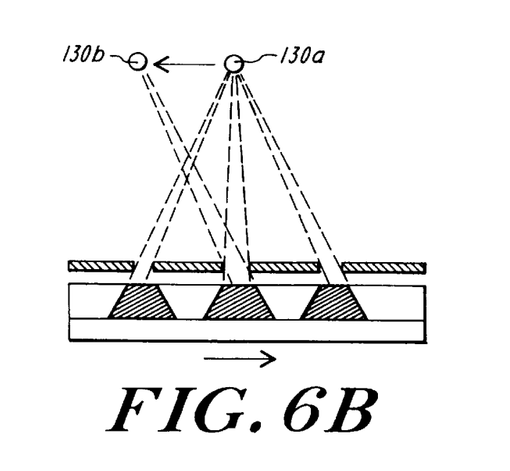
Figure 7:
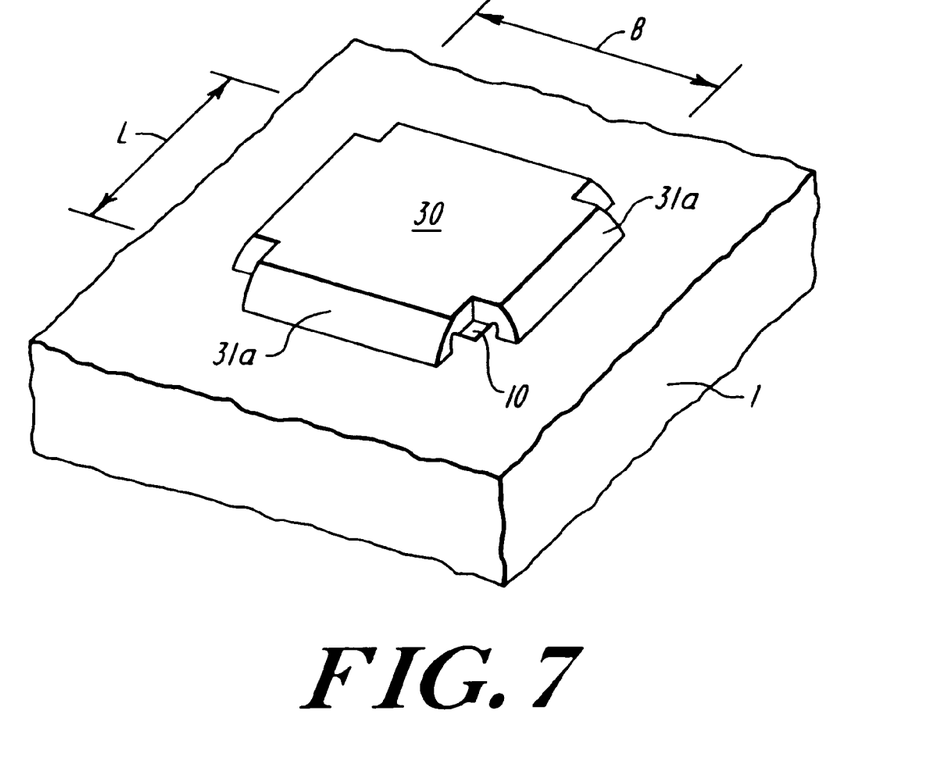
FIG. 7 shows a detail of a diaphragm stop formed in accordance with the aspect illustrated in FIG. 6C.

FIGS. 6A–6C show exposure apparatus for yet another their practice of the invention, wherein patterning of a thick film is carried out to alter the exposure at depth in such a way as to faithfully reproduce a deeply patterned topography.

In this aspect, wafer 1 is mounted on a stage 100 and the resist is exposed preferably through a pattern-defining mask 104 to a source of radiation 130. FIG. 6A illustrates an exposed region 1a of the resist and non-exposed regions 1b, the varying density of shading in the region 1a indicating a drop-off in exposure intensity with depth. This situation corresponds to the prior art exposure configuration, if it were applied to a thick resist, and illustrates the non-uniformity of exposure characteristic of that approach.

However, in accordance with this aspect of the invention, the exposure angle is changed to carry out the additional exposure as shown in FIG. 6B. The additional exposure is effected by non-normal illumination, e.g., by relative positioning of the substrate and exposure source 130 offset from each other, or exposing with oblique light rays.

In FIG. 6B this is shown by illustrating in phantom different exposure sources 130a, 130b, or the same source at different locations denoted by 130a, 130b at two different times. Such exposure may be obtained, for example, by rotating the source about an axis normal to the plane of the wafer. With this off-axis illumination, each opening in the mask is imaged as an oblique or conical column, so the source throws a penumbra-shaped flare region at the edges of the column below each surface opening of the mask. The result is an exposed wafer wherein exposure extends downwardly from the surface in a conical volume of partially-exposed resist so that the cross-section of the exposed area increases with depth precisely as the intensity of exposure becomes less. The Figure illustrates the form of the exposed region for a simple pattern opening.

This pattern, when developed, retains a sharper delineation below the surface pattern edge and resists undercutting or erosion with depth.

The penumbral or conical illumination pattern may also be obtained by rotating an obliquely oriented exposure beam apparatus about the wafer, or by putting the wafer on a stage that is slanted with respect to the axis of the exposure beam and rotating the stage. Alternatively, an annular lamp centered over the wafer, or a continuous region extended exposure source may be used for exposure.

Another way to achieve such a conical semi-exposed volume in the patterned resist is to provide a plurality of point illumination sources 131a, 131b . . . 131n at fixed locations as illustrated in FIG. 6C to illuminate obliquely through the pattern openings. In any of these exposure setups, the essential result is to expose a deep film to a pattern from a plurality of different exposure directions to create a conical region of decreasing exposure and increasing size with depth such that it develops to a well defined pattern. Thus, the invention contemplates a large area of partially-exposed resist, that is partially-developed, with the competing hardening and solvation or etch processes yielding deep patterns of enhanced precision.

With this latter embodiment, a vertical pattern edge is not generally achieved, since that would require precisely balancing effects of the highly unrelated illumination and exposure reactions and the etch or solvent mechanics of the development steps. Advantageously, however, this form of exposure readily produces a metallized cap structure of enhanced form, e.g., having a downwardly-thickening wall as shown in detail 31a of FIG. 7. Compared with the straight pattern structure illustrated in FIG. 3A, this embodiment wherein the support posts widen out toward their periphery, produces a better-anchored thick metal structure of enhanced resistance to peel-off under extreme overpressure conditions.

This completes a description of the thick film lithography of the present invention for forming a macrostructural element in a representative device. It will be understood that such description is intended as illustrative, and the invention may take other forms without departing from the spirit and scope of the practice described herein. Variations and modifications will occur to those skilled in the art, and all such variations and modifications are considered to be within the scope of the invention, as defined by the claims to follow.

We claim:

1. A method for fabricating a mechanical overpressure stop on a pressure sensor having a silicon substrate and a sensing diaphragm comprising the steps of depositing a layer of sacrificial material to form a spacer on said silicon substrate adjacent to said sensing diaphragm, depositing a metalization layer on said silicon substrate and said spacer, depositing a layer of dry film resist upon said metalization layer, wherein said dry resist layer is deposited in successive layers each less than approximately twenty-five micrometers thick, each layer being patterned in registry with a previously deposited resist layer before deposit of a subsequent layer, removing a portion of said resist layer at locations adjacent to said spacer to partially expose said metalization layer, depositing a metal layer upon exposed positions of said metalization layer to form said mechanical overpressure stop, and removing the remainder of said resist layer and said spacer.

2. The method of fabricating a mechanical overpressure stop on a pressure sensor according to claim 1, wherein said step of depositing said resist layer provides said layer with a thickness greater than ten micrometers, and said step of removing a portion of said resist layer develops said resist layer uniformly in vertical sections extending through its thickness so that said resist layer is removed selectively.

3. The method of claim 1, wherein said step of depositing deposits each resist layer as a continuous sheet extending uniformly over a surface, and subsequently exposes each said deposited resist layer to a pattern of radiation prior to deposition of a next successive layer.

4. The method of claim 1, wherein said step of depositing exposes the resist layer to a patterning radiation that is strongly absorbed by said resist layer, and further comprising the step of providing a thermal gradient between the top and the bottom of the resist layer to enhance exposure sensitivity to radiation at the bottom of the layer.

5. The method of claim 4, wherein the step of providing a thermal gradient includes circulating fluid over the top of the resist layer and heating said substrate during patterning.

6. The method of claim 1, further including the step of selecting the resist layer to be a material that absorbs radiation in a selected wavelength range, and wherein said step of patterning exposes at least one of the resist layers by orienting said resist layer and a source of radiation transversely to an axis of illumination to produce an exposure penumbra adjacent to exposed regions, a width of the penumbra increasing with depth such that, once exposed, the exposed resist develops in a uniform manner to delineate a pattern edge.

7. The method of claim 1, further comprising the step of electroplating a metal deposit where said metalization layer is exposed by employing said metalization layer as a conductive electrode for said electroplating.

8. The method of claim 1, wherein the step of depositing a metalization layer comprises exposing the pressure sensor to a metalizing environment to deposit a layer of metal less than approximately one micrometer thick.

9. The method of claim 7, wherein said step of electroplating with said metalization layer as an electrode includes pulse electroplating said metal deposit to a thickness substantially equal to that of the resist layer.

10. The method of claim 1, wherein said step of depositing a metal layer forms a cap over said sensing diaphragm on said silicon substrate.

11. The method of claim 10, therein said step of depositing a metal layer forms said cap over the sacrificial material, and
   further comprising the step of removing the sacrificial material to leave a precision gap between the cap and the diaphragm.

12. The method of claim 10, wherein said step of depositing a metal layer forms said cap as a sheet supported about its periphery by a pedestal structure, and is spaced from said diaphragm by a thickness effective to limit displacement of the diaphragm to less than several micrometers when a pressure over several hundred psi acts on the diaphragm.

13. The method of claim 10, wherein said step of depositing a metal layer forms said cap spaced from said diaphragm by a thickness effective to limit displacement of the cap to less than one micrometer when acted upon by a pressure of several thousand psi.

14. A method of fabricating metal mechanical structures having an out-of-plane offset greater than ten micrometers, said method comprising the steps of
   forming, patterning and developing a dry film resist layer to provide a patterned surface onto which metal is deposited to thereby achieve a selected pattern of metal, and characterized in that said step of forming, patterning and developing deposits the resist layer with a thickness greater than ten micrometers in successive layers each less than approximately twenty five micrometers thick, patterns each said deposited layer in registry with a previous layer before deposit of a subsequent layer, and develops said patterned resist layer substantially uniformly in vertical sections extending through its thickness.

15. The method of claim 4, wherein the resist comprises dry resist that is deposited in successive layers each less than approximately twenty-five micrometers thick, each layer being patterned in registry with a previous layer before deposit of a subsequent layer.

16. The method of claim 14, wherein the resist is exposed to a patterning radiation that is strongly absorbed by said resist, and further characterized by the step of providing a thermal gradient between top and bottom of the resist layer that enhances exposure sensitivity to radiation at the-bottom of the layer.

17. The method of claim 16, wherein said forming, patterning and developing step forms, patterns and develops the resist layer to define a pattern for forming metal features on a workpiece, and further includes supporting the workpiece on a heated stage to achieve the thermal gradient.

18. The method of claim 14, wherein the resist is formed of material that absorbs exposure radiation, and exposure is effected by orienting at least one of the resist and the source of radiation transversely to an axis of illumination to produce an exposure penumbra adjacent to exposed regions, the width of the penumbra increasing with depth such that, once exposed, the exposed resist develops in a substantially uniform manner to delineate a pattern edge.

19. The method of claim 14, wherein the resist layer has a thickness of approximately 50–150 micrometers, and further comprising the steps of depositing a metal in patterned regions to create a pressure stop lying over a semiconductor membrane formed on a substrate.

20. The method of claim 14, wherein the resist layer has a thickness of 50–150 micrometers, and further comprising the steps of
   a) premetalizing patterned regions to form conductive regions of attachment, and
   b) using the conductive regions of attachment as electrodes, pulse electroplating a thick metal deposit in the patterned regions.

21. The method of claim 20, wherein the step of premetalizing includes depositing a metal by exposure to a metalizing environment through a pattern mask to deposit a layer of metal less than approximately one micrometer thick.

22. The method of claim 20, where the step of electroplating includes pulse electroplating with a silicon compatible metal to a thickness substantially equal to that of the resist layer.

23. The method of claim 20, wherein the pattern of metal is deposited as a cap over a sensing diaphragm formed on a silicon wafer.

24. The method of claim 23, wherein the cap is formed over a sacrificial layer, and further comprising the step of removing the sacrificial layer to leave a precision gap between the cap and the diaphragm.

25. The method of claim 23, wherein said premetalizing step forms said cap as a sheet supported about its periphery by a pedestal structure, and spaced from said diaphragm by a thickness effective to limit displacement of the diaphragm to less than several micrometers when a pressure over several hundred psi acts on the diaphragm.

26. A method of forming a metal structure on a surface of a workpiece, said method comprising the steps of
   premetalizing the surface with a metal layer,
   depositing a plurality of dry film resist layers on the workpiece, wherein each said layer is patterned by exposure to an obliquely extending radiation to pattern said layer in registry with a previously deposited layer before deposit of a subsequent layer, developing portions of said resist layers exposed to the radiation to form a pattern having a shape of the metal structure in said resist layers, and metalizing the pattern to form the metal structure.

* * * * *